Oct. 11, 1927.
W. H. EWEND
MOTOR VEHICLE
Filed Dec. 5, 1925
1,645,322
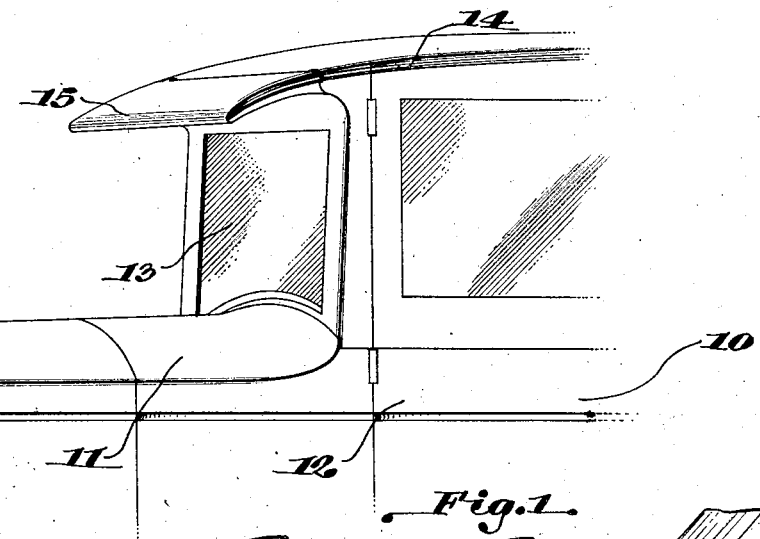
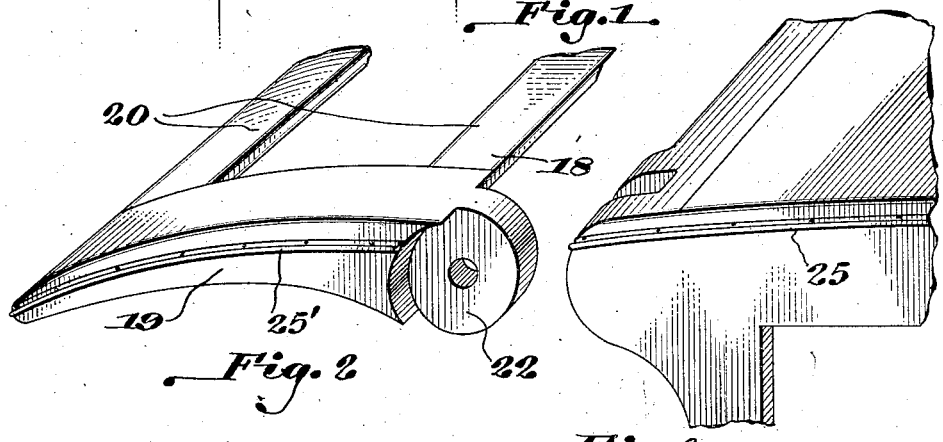
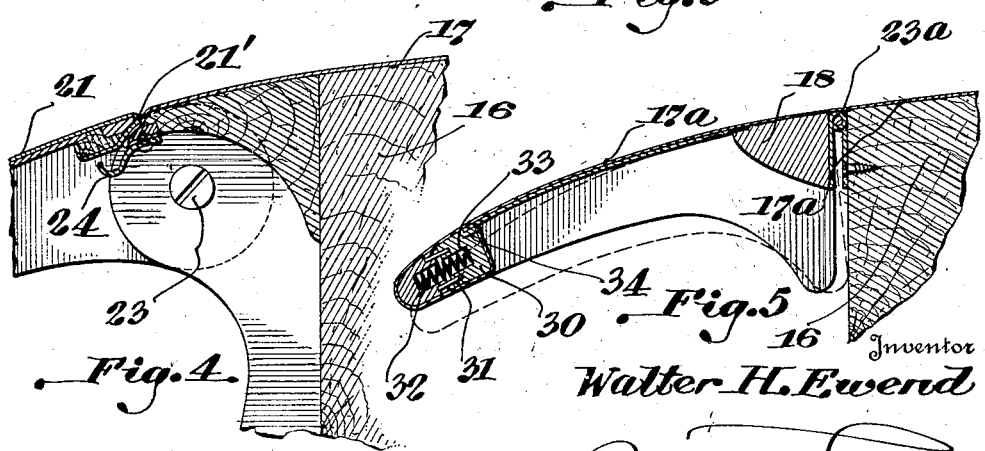
Inventor
Walter H. Ewend Patented Oct. 11, 1927.

1,645,322

UNITED STATES PATENT OFFICE.

WALTER H. EWEND, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed December 5, 1925. Serial No. 73,295.

This invention relates to motor vehicles and particularly to the body construction thereof.

One of the objects of the invention is to provide a body of the closed type with a pivoted visor so that the occupant of the vehicle may move the visor to the position best suited for his convenience.

Another object of the invention is to provide a body with a movable visor that will retain the curved lines of the roof.

Another object of the invention is to provide a body and visor construction in which the top covering for both will be continuous over the joint between them.

Another object of the invention is to provide a pivoted visor with its pivot adjacent the joint between the visor and the body so that movement of the visor will cause very slight stretch or take-up of the covering material over the joint.

Other objects of the invention will appear from the following description taken in connection with the drawing, which forms a part of this specification, and in which:

Fig. 1 is a perspective view of the front part of a motor vehicle body embodying the invention;

Fig. 2 is an enlarged perspective view of one of the ends of the visor shown in Fig. 1;

Fig. 3 is an enlarged perspective view of one corner of the body with the visor removed;

Fig. 4 is a vertical section through the front wall of the body and a portion of the visor connected thereto, and Fig. 5 is a view similar to Fig. 4 showing another form of the invention.

Referring to the drawing, 10 indicates generally a motor vehicle body having a cowl 11, a side door 12, a front wall or windshield part 13, and a roof or top covering 14. A visor 15 is shown as forming a continuation of the roof portion of the vehicle extending as it does forwardly from the upper part of the vehicle wall 13. The roof 14 curves downwardly slightly at the front end of the body and the visor 15 forms a continuation of that curve. This is in the interest of beauty in design of body lines.

As vehicle bodies must be built exactly alike in order to attain greater production at a low cost, it is desirable to have certain parts movable to fit the various persons who are to use them. It is very desirable that the visor extending forwardly over the windshield shall fit the height of the driver in order that it may give the greatest protection from the sun without, at the same time, impairing the vision of the driver. The present invention, therefore, contemplates making the visor movable without at the same time impairing the curved body lines.

In the form of the invention shown in Figs. 1 to 4, the body frame is indicated at 16 and over the roof of this frame is stretched the top material or cover 17. The visor frame is indicated at 18 having side pieces 19 and longitudinal pieces 20, as shown particularly in Fig. 4. Top or covering material 21 is stretched over the frame of the visor.

The visor has a hinge piece 22 which is pivoted to the body frame as at 23, and this pivot provides for just enough movement of the visor to take care of the maximum and minimum height requirements of most people. Thus the movement of the visor will to such a slight degree affect the continuing curve of the body roof and visor cover that this curve will not be visibly changed by the movement of the visor from one position to another.

It is intended that the covering material of the body and visor will have surface contact at the joint 21', so that there will be practically no leakage in the various positions of the visor, but as some water may under unusual conditions leak through the joint, there is provided a trough 24 extending across the body below the joint 21'. The water then leaking through the joint 21' will be carried by the trough 24 to the sides of the vehicle and not fall on the glass of the windshield.

The vehicle body is provided at each side and slightly below the line of the roof with a gutter 25 and there is a continuation of this gutter on the side of the visor, as shown at 25' so that the water will be carried well forward before it falls from the roof.

In the form of the invention shown in Fig. 5, the pivot 23[a] between the body 16 and the visor frame 18 is even closer to the covering material 17[a], and in this case the covering material 17[a] extends across the joint between the body frame and the visor so that it is continuous at that point and there can be no leak between the body and the visor. By thus arranging the pivot 23ª close to the covering material, the latter is stretched to a very slight degree when the visor is moved downwardly and it will contract sufficiently when the visor is moved upwardly so that there will be no wrinkling of the covering material at the joint. This structure also retains the curved lines of the body and yet the visor is made so that it can be used to fit the desires of the driver of the vehicle.

In case a greater movement of the visor is desired, the slack in the top material may be taken up automatically by providing a two-part frame member at the front of the visor with springs for separating the members. Thus, in Fig. 5, the front member 30 of the frame 18 of the visor is made in two parts dowelled together as by the dowel pins 31, and several springs 32 are arranged in recesses 33 suitably spaced along the two parts of the member 30. The top material 17ª is stretched around the two parts of the member 30 and is secured to the inner part of the member as at 34. In this way the top material is constantly stretched outwardly and maintained taut, and any change in position of the visor is automatically compensated for.

It will be understood that various forms of the invention other than those described above may be used without departing from the spirit or scope of the invention.

Having thus described my invention, what I claim and desire to secure by Letters Patent is:

1. In a motor vehicle body comprising a vertical wall and a roof, the roof being slightly curved where it meets the vertical wall, a visor extending outwardly from the vertical wall and forming a curved continuation of the roof, said visor being pivotally supported by the body, a unitary top cover for the roof and visor and means for maintaining a tension on the cover.

2. A motor vehicle body comprising a front wall and a roof, a visor pivoted to the body where the roof joins the front wall, said visor forming a continuation of the roof to preserve the curved lines thereof, a unitary top cover for the roof and visor and means for maintaining a longitudinal tension on the cover.

3. A motor vehicle body comprising a front wall and a roof, and a visor having a top covering and side flanges, and means for pivoting the visor for movement relative to the vehicle roof, the top covering of the visor forming a continuation of the top of the roof and means for maintaining tension on the top cover.

4. A motor vehicle body comprising a body frame, a visor frame pivotally connected to the body frame, a top covering for the roof of the body frame and for the visor frame, said covering extending over the joint between the body frame and the visor frame and means in the free end of the visor frame for maintaining a longitudinal tension on the cover.

5. A motor vehicle body comprising a body frame and a visor frame pivoted thereto, a top covering extending over both frames adapted to permit slight movement of the visor frame relative to the body frame and means for expanding the free end of the visor frame to maintain a tension on the cover.

6. A motor vehicle body construction comprising a body frame and a visor frame pivoted to the body frame, a covering for both frames forming a continuous piece over the joint between them and means for maintaining tension on the cover.

7. A motor vehicle body construction comprising a body frame, a visor frame, a unitary covering over the two frames overlapping side flanges on the body frame and visor frame at each end of the visor frame and spring pressed means for supporting the covering.

8. A motor vehicle body comprising a roof, a visor pivoted thereto and forming a forward continuation thereof, means forming a joint between the roof and visor in the various positions of the visor, a unitary cover for the roof and visor and means for maintaining a tension on the cover.

9. A motor vehicle body comprising a roof, a visor pivoted thereto and forming a forward continuation thereof, and sliding contacting faces between the roof and visor, a unitary cover for the roof and visor and means in the free end of the visor for maintaining tension on the cover.

In testimony whereof I affix my signature.

WALTER H. EWEND.